United States Patent [19]

Watanabe

[11] Patent Number: 4,937,805

[45] Date of Patent: Jun. 26, 1990

[54] INFORMATION RECORDING MEDIUM AND METHOD OF INHIBITING REPRODUCTION OF BLANK AREAS

[75] Inventor: Kenji Watanabe, Saitama, Japan

[73] Assignee: Pioneer Electronic Corporation, Tokyo, Japan

[21] Appl. No.: 464,605

[22] Filed: Jan. 12, 1990

Related U.S. Application Data

[63] Continuation of Ser. No. 154,411, Feb. 10, 1988, abandoned.

[30] Foreign Application Priority Data

Feb. 10, 1987 [JP] Japan .................................. 62-28753

[51] Int. Cl.⁵ .............................................. G11B 7/00
[52] U.S. Cl. ......................................... 369/59; 269/48
[58] Field of Search ..................................... 369/59, 48

[56] References Cited

U.S. PATENT DOCUMENTS

| | | | |
|---|---|---|---|
| 4,445,195 | 4/1984 | Yamamoto | 360/48 |
| 4,489,398 | 12/1984 | Sugiyama et al. | 369/32 |
| 4,496,993 | 1/1985 | Sugiyama et al. | 369/47 |
| 4,541,022 | 9/1985 | Katsuyama | 369/47 |
| 4,667,318 | 5/1987 | Sugiyama et al. | 369/59 |
| 4,723,235 | 2/1988 | Yasuda et al. | 369/32 |
| 4,734,901 | 3/1988 | Murakami | 360/40 |
| 4,740,938 | 4/1988 | Bierhoff et al. | 369/30 |

Primary Examiner—Vincent P. Canney
Attorney, Agent, or Firm—Sughrue, Mion, Zinn, Macpeak & Seas

[57] ABSTRACT

A recording medium and a method for recording and reproducing a recording medium in which the silent time between successive selections is reduced. An analog sound signal to be recorded is digitized and divided into blocks for recording. For each block, a time signal indicating the total reproducing time for the block is recorded. Upon reproduction, the reproduction time is monitored to determine whether is exceeds the value indicated by the respective time signal. If so, reproduction of the current selection is immediately terminated and reproduction of the next selection in sequence is commenced.

4 Claims, 1 Drawing Sheet

INFORMATION RECORDING MEDIUM AND METHOD OF INHIBITING REPRODUCTION OF BLANK AREAS

This is a continuation of application Ser. No. 154,411, filed Feb. 10, 1988, now abandoned.

BACKGROUND OF THE INVENTION

The present invention relates to an information recording medium and a method for recording and reproducing information on a recording medium suitable for digitally recording a continuous signal such as an audio signal.

When a sound signal is recorded on a recording medium such as an optical disk or the like, the sound signal to be recorded is sampled at a predetermined frequency and the sampled analog signal is converted to digital form. The digital signal is loaded into a memory. Generally, a pair of memories are provided so that data can be written into one of the memories while data is being simultaneously read out of the other memory and recorded on the medium. That is, the digital signal to be recorded is divided into blocks corresponding to the size of the memories, and the digital information is recorded on the recording medium block by block.

For example, assuming a sampling frequency of 15 kHz, a number of quantizing bits of 10, a compressed data length of eight bits, and a capacity of each memory of 256 kilobytes, the time required to store one block of the digitized sound signal data in one memory is about eight seconds $((256 \times 10^3 \times 8)/(15 \times 10^3 \times 8 \times 2))$ in a two-channel (right and left channels) stereophonic mode.

In this system, it often occurs that there is a blank area of one to seven seconds in the final block of data recorded on the disk. It has been impossible during reproduction with conventional systems to terminate the reproducing process prior to the end of the reproduction of this blank area. That is, it has conventionally been impossible to reproduce another musical selection or the like until the reproduction of this blank area of one to seven seconds has been completed.

SUMMARY OF THE INVENTION

It is an object of the present invention to overcome the drawbacks of the prior art as described above.

More specifically, it is an object of the present invention to provide an information recording medium and a method for recording and reproducing information on a recording medium with which reproduction of the blank area of a last-recorded block is eliminated and a subsequent selection or other data can be immediately reproduced after the completion of the previous selection.

In accordance with the above and other objects, the present invention provides an information recording medium and a method for recording and reproducing information on a recording medium in which, in addition to the normal signal blocks, a signal representing the total effective reproduction time (actual playing time of nonblank portions) of each block of data is also recorded with the block.

DESCRIPTION OF THE PREFERRED EMBODIMENTS

Preferred embodiments of the invention will now be described with reference to the attached drawings.

Figure 1:
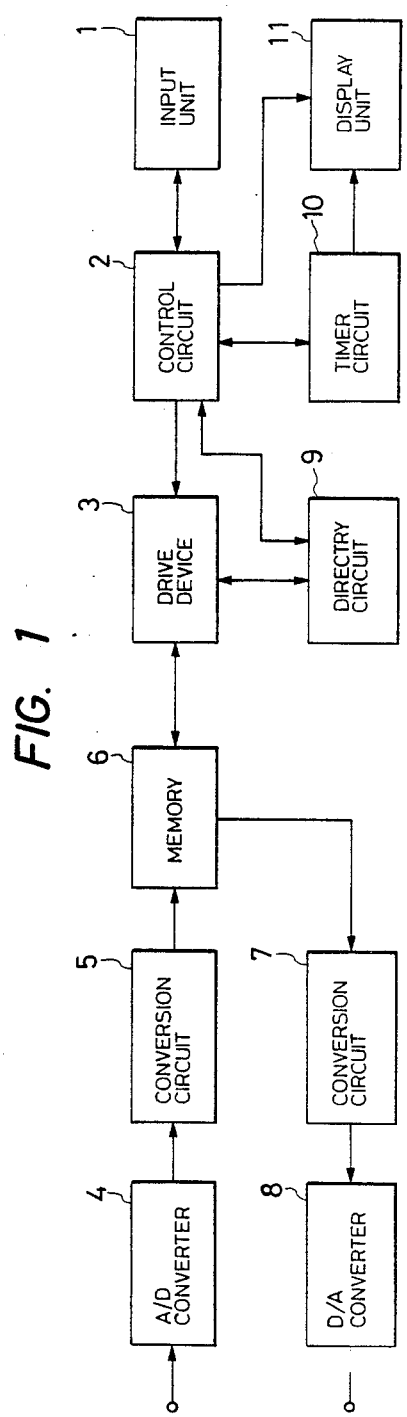
FIG. 1 is a block diagram showing an information recording/reproducing system for an optical disk which is adapted for use in the practice of the present invention.

Referring first to FIG. 1, an information recording/reproducing apparatus which operates in accordance with the principles of the present invention will be described.

When a start command for a recording operation is entered through an input unit 1, which may be implemented with a keyboard or the like, a control circuit 2, constituted by a microprocessor or the like, controls a drive device 3 to start a recording operation.

At that time, an analog audio signal applied to an A/D converter 4 is sampled at a predetermined frequency to be converted into a digital signal. A digital signal for one channel composed initially, for example, of 10 bits, is compressed into an eight-bit signal by a conversion circuit 5. The data produced by the conversion circuit 5 is applied to and stored in a memory 6. The memory 6 is constituted by a pair of memories, as described above. That is, while data is being written into one of the two memories, data is simultaneously read out of the other memory for recording. Reading and writing are alternately switched between the two memories. The respective blocks of data read out from the memory 6 are applied to the drive device 3 and successively recorded on an optical disk at designated positions.

Figure 2:
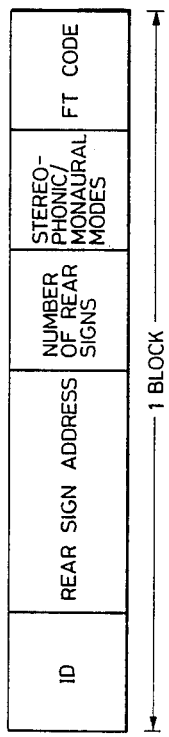
FIG. 2 is a diagram showing the format of a signal recorded on an optical disk of the invention using the system of FIG. 1 and the method of the invention.

The control circuit 2 further controls a directory circuit 9 so as to generate directory information for each block. The format of this directory information is constituted, for example, as shown in FIG. 2.

The directory is also divided into blocks corresponding to the audio signal, with each block being constituted by an ID (identification datum), a rear sign address, a number of rear signs, a code for discriminating between the stereophonic and monaural modes, and an FT code. The rear sign address is an address of a recorded portion differing from the proper position where the sound data was originally intended to be recorded, which is employed when data cannot be recorded in a particular area due to the presence of a defect. The number of rear signs represents the number of times sound signals have been recorded in different locations in this manner. The discriminating code for the stereophonic and monaural modes indicates whether the accompanying data has been recorded in the stereophonic or the monaural mode.

The FT code is constituted by an F (flag) code, which indicates whether the present block is a final block, and a T (time) code which indicates the total reproduction time of an effective (nonblank) portion of the audio signal recorded in the block. The F code can be set, for example, to "1" in a final block and to "0" for a nonfinal block. The T code should be set to indicate, for example, the total eight-second playing time for a nonfinal block, and, for instance, to indicate three seconds, namely, the length of the sound-containing portion (the blank portion is five seconds) for a final block. That is, the value of the T code is set in accordance with the amount of time occupied by the nonblank portion of the final block.

The value of the T code is supplied from a timer circuit 10 (which may, if desired, be incorporated into the control circuit 2) which measures the amount of time from the start of the final block containing non-blank information. When the input unit 1 is not operated from the start of a block to the end of the block, that is, in a nonfinal block, the control circuit 2 controls the directory circuit 9 so as to produce T-code values corresponding to the maximum block reproduction time of eight seconds. On the other hand, for a final block, the input unit 1 is operated to indicate when the sound-containing portion of the block is finished. A code value representing the amount of time measured by the timing circuit 10 from the start of the block until the completion of the sound-containing portion is produced at the output of the directory circuit 9. This directory information is applied to the drive device 3 and recorded on the optical disk in a predetermined region, which is preferably separate from the region in which the sound signal is recorded. In this manner, a sound signal is divided into blocks and recorded on the optical disk.

When a reproduction start command is entered through the input unit 1, the control circuit 2 controls the drive device 3 so as to reproduce the information recorded on the optical disk. The reproduced digital sound signal is first stored in the memory 6 and then read out therefrom and converted (expanded) by the conversion circuit 7 from eight-bit data to 10-bit data. The 10-bit data is then converted into an analog signal by the D/A converter circuit 8 and the resulting signal applied to an output terminal.

On the other hand, the reproduced directory signal is applied to the directory circuit for detection. When the detected F code indicates the presence of a new block, that is, the start of the reproduction of a new selection, the control circuit 2 activates the timer circuit 10 to measure the time indicated by the T code (eight seconds for nonfinal blocks) and also instructs a display unit 11 to display the measured time. That is, the time corresponding to the T code of each block is successively integrated and the result of the integration displayed. Accordingly, the reproducing time from the start of the selection is displayed.

As each block is reproduced, the control circuit 2 monitors whether the time indicted by the T code has passed before the end of the block is reached. In nonfinal blocks, the time indicated by the T code will of course not have passed before the end of the block is reached. In a final block, after the time indicated by the T code (e.g., five seconds) for that block has expired, the timer circuit 10 produces a signal to so indicate to the control circuit 2. At that time, the control circuit 2 produces a program end signal (an input enable signal) to the input unit 1. Accordingly, if the input unit 1 is operated to enter a succeeding command, the input is accepted and executed. For example, in the case where it is instructed to play a selection occurring on the disk three selections after the current selection, a search operation is immediately commenced to move the pickup head to the position on the disk of that selection.

According to the present invention, a time signal indicating the total reproduction time of each block recorded on the disk is recorded along with each block. Upon reproduction, the time signal is employed to mark the end of the reproduction of the corresponding selection and to allow the immediate start of the reproduction of the next selection in sequence selected by the user. Accordingly, the silent time between the playing of successive selections is reduced.

What is claimed is:

1. An information recording medium having an analog signal representing an item of information recorded thereon in the form of a series of blocks of digital data, with the data in each block in said series corresponding to said analog signal representing said item of information, wherein the improvement comprises a plurality of time signals recorded on said medium, each time signal corresponding to a respective one of said blocks following said time signal and indicating a total reproduction time of nonblank portions of the respective block.

2. A method for recording and reproducing information on a recording medium comprising:

for recording each of a plurality of selections on said medium:

converting a continuous analog signal into successive blocks of digital data;

providing a plurality of time signals, each time signal corresponding to one of said blocks and indicating a total reproduction time of nonblank portions of the respective block; and recording said blocks of digital data on said recording medium together with said time signals; and for reproducing each selection:

reading in succession said blocks of digital data and the corresponding time signals from said medium;

determining for each of said blocks whether a time indicated by the respective time signal has expired before the end of the reproduction of the block; and, if said time indicated by said respective time signal expires before the end of the reproduction of said block, immediately terminating reproduction of the selection and commencing reproduction of a next subsequent selection.

3. The recording and reproducing method of claim 2, wherein said step of determining whether a time indicated by the respective time signal has expired comprises loading said respective time signal into a timer circuit and monitoring an output of said timer circuit.

4. The recording and reproducing method of claim 2, further comprising the step of displaying a reproducing time in accordance with said time signals.

* * * * *